2,768,980

CRYSTALLIZATION OF MANNITOL FROM SORBITOL

Frederick Richard Pence, New Castle, Del., assignor to Atlas Powder Company, Wilmington, Del., a corporation of Delaware No Drawing. Application November 20, 1952,
Serial No. 321,733

2 Claims. (Cl. 260—637)

This invention relates to processes of chemical manufacture and more particularly to a process of crystallization.

It is an object of the present invention to provide a process for the removal of mannitol from an aqueous and/or organic solution of polyols.

Another object is to provide a process for the removal of final traces of dissolved mannitol in excess of saturation from solutions containing a high percentage of sorbitol or polyols which are sorbitol degradation products and which may also contain sorbitol resulting from such processes as the chemical, electrical, or catalytic reduction of mono- or polysaccharides or their polyol derivatives.

Another object is to provide a process for the preparation of a polyol syrup produced by the chemical or electrolytic reduction of mono- or polysaccharides, which is free from sparsely soluble hexitols in excess of saturation.

Another object is to provide a process for the preparation of a viscous, aqueous solution containing a high percentage of sorbitol or polyols which are sorbitol degradation products and which also contains dissolved sparsely soluble hexitols, free from any dissolved, sparsely soluble hexitols in excess of saturation.

A further object is to improve the yield of recoverable mannitol when produced in association with hexitols and other polyols which are water soluble by the reduction of mono- or polysaccharides or their polyol derivatives.

These and other objects will become apparent in the course of the following description and claims.

The reduction and/or degradation of mono- and polysaccharides and their polyol derivatives in water solution by chemical, electrical, and catalytic methods is well known. (Ipatieff, "Ber. deut. chem." No. 45, p. 3218, 1912). Descriptions of such processes may also be found in the United States patents to Creighton, No. 1,712,952; Lautenschlager et al., No. 1,915,431; Larchar, No. 1,963,997; Mueller et al., No. 1,990,245; Creighton, No. 1,990,582; Rothrock, No. 2,004,135; Hanford, No. 2,209,055; Power, No. 2,280,975; Brown, No. 2,280,887; Hales, No. 2,289,189; Lenth et al., No. 2,290,439; Rose, No. 2,292,293; Hales, Nos. 2,330,218 and 2,303,210; Bottoms et al., No. 2,335,731; Stengel et al., No. 2,381,316; Hartstra et al., No. 2,518,235; Creighton et al., No. 2,458,895; and Lolkema et al., No. 2,546,103. These processes are also discussed in numerous domestic and foreign publications.

While the solubility of sorbitol in water is very high, permitting the formation of heavy syrups high in sorbitol content which are excellent as humectants for tobacco, glue and the like, the solubility of the isomeric mannitol is relatively low. It has been found that in any of the above-described processes for the production of sorbitol syrups or syrups containing polyols which are sorbitol degradation products and which may also contain sorbitol, mannitol is also produced either by virtue of choice of starting materials or reaction conditions favoring formation of such a product.

In practice it has been a difficult and expensive process to remove mannitol from such mixtures to a sufficient extent that the syrupy polyol solutions will remain clear on storage. Separation of the mannitol by crystallization from syrups of desirable water content for storage (15 to 18% water) is not feasible because of the high viscosity of the liquid phase. Crystal growth is inhibited and filtration is virtually impossible. The bulk of the mannitol may be crystallized and filtered from solution of higher water content by cooling to temperatures well below storage temperatures of the final syrup. It is found, however, that the viscosity-concentration-temperature relationship is such that operable conditions for filtering separated crystals always leave enough mannitol in the filtrate that when it is concentrated to a syrup the latter is supersaturated with respect to mannitol. Storage of the concentrated syrup results in the formation of an unsightly white "cloud" of precipitated mannitol crystals therein. The only practical prior art method of preparing storage-stable syrups from polyol mixtures containing mannitol has been to crystalilze the mannitol from a mixed aqueous-organic liquid solvent (alcohol is usually employed) in which mannitol is less soluble than it is in an aqueous solution. After crystallization and filtration the alcohol is removed by evaporation and the resulting syrup adjusted to the desired water content. The process is expensive by virtue of solvent losses and the necessity of rectifying the recovered aqueous-alcohol mixture obtained in the process.

The present invention is based on applicant's discovery that, in aqueous solutions of non-crystallizing polyols, mannitol is more sparingly soluble when the solution is acid, i. e., when the pH is below about 4.0 and is preferably below about 3.5, than when it is more nearly neutral, i. e., between pH values of 4 and 7. In accordance with the invention, then, a concentrated, viscous, storage-stable solution of non-crystallizing polyol is prepared from a polyol composition containing mannitol, by adjusting the ratio of water to non-crystallizing polyol in the composition to a value substantially higher than that desired in the final syrup, thereby forming a menstruum in which nucleation and crystal growth of mannitol is favored, and from which separated crystals can be filtered; acidifying the said composition to a pH value below about 4, and preferably below about 3.5; crystallizing the mannitol from said acidified composition; filtering the separated mannitol crystals; adjusting the pH of the filtrate to a value above 4, and preferably between 5 and 7; and concentrating the filtrate.

The process will be described in more detail in terms of the preparation of a storage-stable polyol, of 84% solids content, containing sorbitol and the related non-crystallizing products obtained by the reduction of alkali treated glucose, in which reduction mannitol is simultaneously formed. The non-crystallizing polyol content of the reduced product is determined by any suitable means and the solution is adjusted to contain from 30 to 35 parts by weight of water per 100 parts of said non-crystallizing polyol at a temperature above that at which mannitol crystallizes. The pH of the solution is adjusted to below 4 and preferably to about 3.5. This may be accomplished, for example, by the addition of mineral acid or by passing the solution through an ion exchange resin to replace metallic cations contained therein with hydrogen ions. The solution is then cooled and held at a temperature in the range of from 18° to 22° C., preferably with gentle agitation, until substantial equilibrium with the crystallizing mannitol is established. The mannitol is separated by filtration, and the acidity of the filtrate decreased, for example, by the addition of alkali or by passage through an anion exchange resin. The pH is preferably adjusted to a value between 5 and 7. The solution is then concentrated by evaporation to a solids content of 84%, yielding a viscous syrup which remains clear on storage at ordinary temperatures.

It will be obvious to those skilled in the art that if the final syrup is to be of higher water content than the 16% referred to in the above description, the water to non-crystallizable polyol ratio in the pH adjusted solution may be correspondingly higher. As a rough guide it may be said that the ratio of water to non-crystallizable polyol in the acidified solution from which mannitol is to be crystallized should not be greater than about 1.85 times the ratio of water to polyol sought in the final syrup, if the crystallization is to take place at a temperature near that at which the syrup is to be storage-stable. The lower limit of the said water to non-crystallizable polyol ratio is not critical, but in order that the solution shall be of sufficiently low viscosity for crystallization and filtration of the mannitol to proceed well it is preferred that it be no less than 25 to 100.

It will, moreover, be obvious that, by lowering the temperature of crystallization, solutions of somewhat higher water content may be processed, while if the crystallization is carried out at a higher temperature the solution must be somewhat less dilute in order to reduce the mannitol content of the finished syrup to the same extent. Such adjustments are within the skill of the art and processes employing them are considered to be within the scope of this invention.

Reference has been made hereinbefore to a determination of the non-crystallizable polyol content in the reduction product of a reducible sugar. A suitable method for such determination is as follows:

The water content of a sample of the reduction product is determined by any suitable procedure such, for example, as by titration with Karl Fischer reagent, Another weighed sample of the product is then butted with methanol, ethanol and water to the following composition:

| | Parts by weight |
|---|---|
| Solids in the reduction product | 100 |
| Ethanol | 75 |
| Methanol | 75 |
| Water | [1] 30 |

[1] Obviously if the reduction product contains more than 30 parts water to 100 parts solids as received, it must first be concentrated.

This solution is cooled to 20° C. and held at that temperature for 16 hours. The mannitol which crystallizes out is filtered, washed once with 95% alcohol, dried and weighed. The remainder of the solids in the sample is the non-crystallizable polyol sought. From the water content and the weight of mannitol in a weighed sample, the weight of solution required to furnish 100 parts by weight of non-crystallizable polyol is readily calculated.

The following non-limiting examples illustrate the process of the invention.

Example I

An aqueous polyol solution obtained by the alkaline catalytic hydrogenation of invert sugar, at a temperature of 160° C. and under a pressure of 1500 pounds per square inch, employing a nickel catalyst, is subjected to the analysis above-described and contains 80%, based on its solids content, of non-crystallizing polyol. The water content of the solution is adjusted to 21.2%, and the pH to 3.5 by the addition of dilute sulfuric acid. The solution thus contains 21.2 parts by weight of water per 63 parts of non-crystallizing polyol which corresponds to 33.7 parts of water per 100 parts of said polyol. A white precipitate forms on cooling and agitating. The solution is agitated for 4 hours at 20° C., and the mannitol filtered off. The filtrate is adjusted to a pH of 7.0 by the addition of caustic alkali and concentrated by evaporation to a water content of 16%. The resulting syrup exhibits no tendency to cloud after ten weeks of storage at temperatures varying from 15° C. to 30° C.

Example II

A polyol solution, obtained by the electrolytic reduction of invert sugar in alkaline solution is found to contain 75%, based on the solids content, of non-crystallizing polyol. It is acidified by passing through a cation exchanger to a pH of 2.0 and adjusted to a water content of 20.2%. The water-to-non-crystallizing polyol ratio is thus 31.9 to 100. Mannitol is crystallized from the solution as before by agitating at a temperature of 20° C. The residual solution, after filtering off the mannitol, is rendered less acid by passage through a bed of anion exchange resin and concentrated to a syrup of approximately 16% water content. The resulting polyol syrup is storage-stable at ordinary room temperatures.

It is understood, of course, that conventional crystallization aids, such as seeding, gentle agitation, temperature variation and the like, can be employed in the crystallization step.

Equivalent modifications coming within the scope of the inventive concept will be apparent to those skilled in the art.

What is claimed is:

1. A process for preparing a non-crystallizing storage-stable aqueous polyol syrup from the mannitol-containing reduction product of a hexose which comprises adjusting the water to non-crystallizing polyol ratio in an aqueous solution of said reduction product to a value of at least 25/100 but not greater than about 1.85 times the water to non-crystallizing polyol ratio in said syrup, adjusting the pH of said solution to a value below about 4, crystallizing and filtering the mannitol from said acidified solution, adjusting the pH of the filtrate to a value between 4 and 7, and concentrating the said filtrate to a syrup.

2. The process of claim 1 wherein the water content of said polyol syrup lies between the inclusive limits of 15% and 18%.

References Cited in the file of this patent

UNITED STATES PATENTS

| 2,280,975 | Power | Apr. 28, 1942 |
| 2,292,293 | Rose | Aug. 4, 1942 |
| 2,516,350 | Sorensen et al. | July 25, 1950 |

FOREIGN PATENTS

| 522,729 | Great Britain | June 26, 1940 |

OTHER REFERENCES

Colbert: Shorter Course in Organic Chemistry, 2nd. ed. (1942), D. Appleton Century, New York, p. 194.

Fieser and Fieser: Organic Chem., 2nd ed. (1950), Heath, Boston: pp. 273, 274.

Yumafuji et al.: (Japan) 1706, March 30, 1951, via Chem. Abstracts, vol. 47 (1953), 605a.